Aug. 7, 1934.   R. S. BROWN   1,969,687
CHUCK
Original Filed April 1, 1926
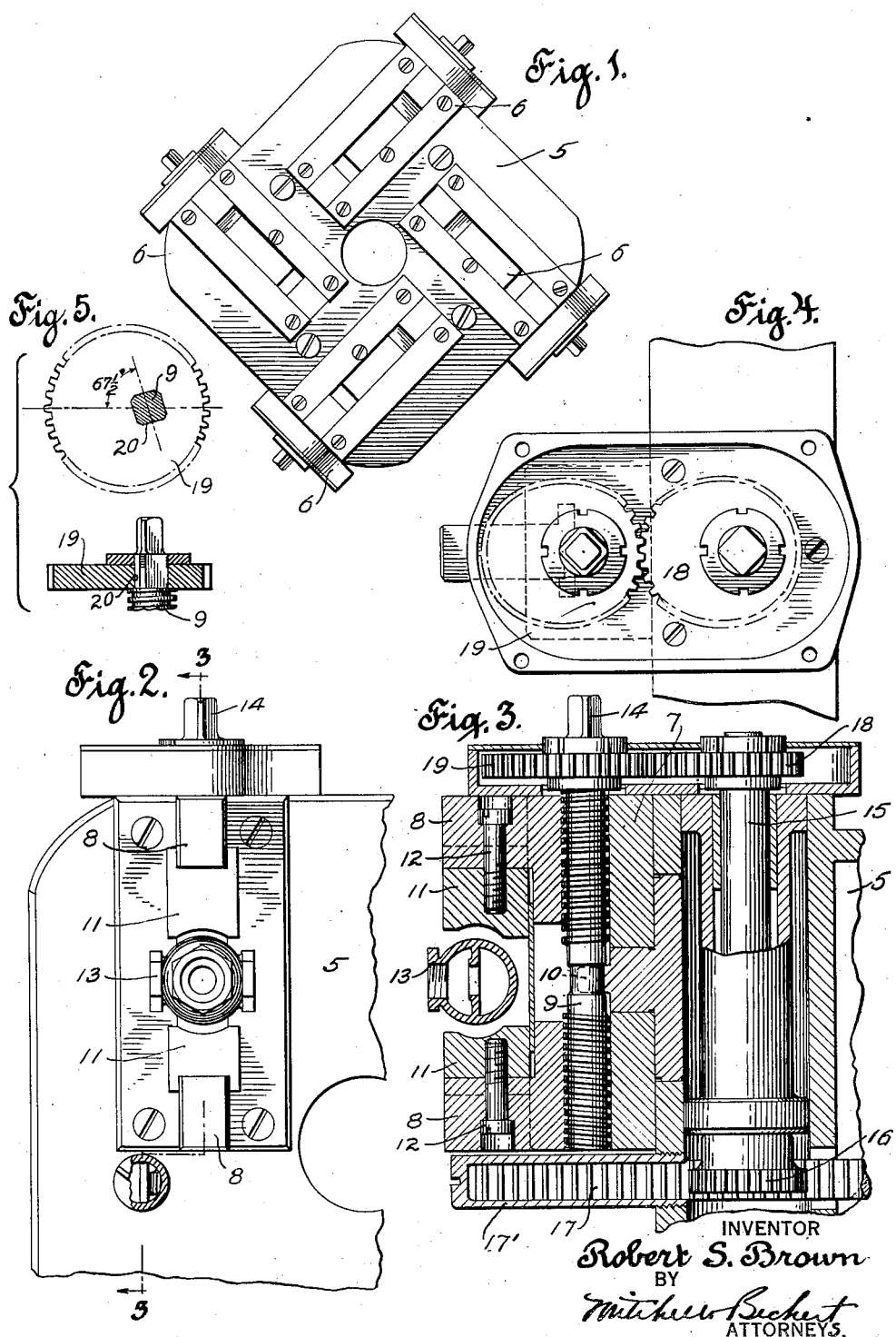
INVENTOR
Robert S. Brown
BY
Mitchell Bechert
ATTORNEYS.

Patented Aug. 7, 1934

1,969,687

UNITED STATES PATENT OFFICE 1,969,687

CHUCK

Robert S. Brown, New Britain, Conn., assignor, by mesne assignments, to The New Britain-Gridley Machine Company, New Britain, Conn., a corporation of Connecticut Original application April 1, 1926, Serial No. 98,974. Divided and this application October 1, 1926, Serial No. 138,852. Renewed October 6, 1931

20 Claims. (Cl. 279—112)

My invention relates to a chuck particularly, though not exclusively, adapted for use in connection with an automatic chucking machine employing a plurality of similar chucks.

This application is a division of my co-pending application, Serial No. 98,974, filed April 1, 1926, as to the matter shown in Figs. 1 to 4 of the drawing.

Among the objects of the invention are:

To provide an improved chuck, which may be operated either manually or by power means, and in which the chuck jaw opening may be relatively large to accommodate work pieces of irregular form; to provide a chuck having means for exerting a variable pressure between the chuck jaws upon the application of a substantially uniform force to a part of said means; and, in general, to provide an improved form of chuck for securely holding small work pieces.

Briefly stated, in the preferred form of the invention I employ two chuck jaws movable relatively to each other for chucking and unchucking a work article. These jaws may be moved by suitable means such as a screw. I may employ power means for rotating the screw, and means preferably in the form of gearing is interposed between the power means and the screw for causing the latter to exert a variable force upon the chuck jaws upon the application of a substantially uniform force to a part of said means. Such gearing may include eccentrically mounted intermeshing gears.

In the drawing which shows, for illustrative purposes only, a preferred form of the invention—

Fig. 1 is a view in end elevation of a turret having four chucks thereon;

Fig. 2 is an enlarged view in end elevation of one chuck shown in Fig. 1;

Fig. 3 is a sectional view taken substantially in the plane of the line 3—3 of Fig. 2;

Fig. 4 is a plan view of the chuck shown in Fig. 3 with a cover plate removed;

Fig. 5 shows a plan and a sectional view of a detail.

In said drawing, 5 indicates a turret which may carry a plurality of (in this case four) chucks 6—6. While the invention will be described as embodied in, and as particularly applicable to, an automatic chucking machine, wherein a plurality of similar chucks are employed on a turret which may be indexed to present work articles in the respective chucks successively to tools, it is to be understood that the principles of the invention are of broader application, and I do not wish to be limited to the particular use to which the improved chuck is to be put.

The chuck includes a body 7, which may be secured to a turret 5. 8—8 indicate two chuck jaws, which may be moved relatively to each other. In the form shown, both jaws are movable, and for the purpose of moving these jaws I may employ a right and left hand threaded screw 9, which may be held against longitudinal movement on the body 7 as by means of an abutment fork 10. False jaws or pads 11—11 may be secured to the jaws 8—8 as by means of screws 12—12. The false jaws may be made so as to conform to the contour of the particular work article 13 to be gripped. The screw 9 may be provided with a suitable tool receiving part 14 for operating the chuck jaws manually when tooling up for any particular work article. It will be clear that, by rotating the screw 9 in one direction, the jaws will be separated, and on rotating the screw in the opposite direction, the jaws will be moved toward each other to gripping position.

The chuck is arranged to be actuated by power means. In the form shown, I employ a shaft 15 journaled in the chuck body and provided at one end with a pinion 16, which may be power driven as by means of a rack 17. The rack may be guarded by any suitable form of housing 17'. As will be readily understood, the rack 17 may be connected to suitable power driven means, such as to a fluid actuated piston or the like. The shaft 15 serves to rotate the screw 9 through suitable means for imparting a variable force to the screw upon the application of a substantially uniform force to the shaft 15. In the particular embodiment shown, I employ an elliptical gear 18 secured upon the shaft 15, and this elliptical gear meshes with a corresponding elliptical gear 19 secured upon the screw 9. With the elliptical gears in the positions shown in Figs. 3 and 4, the chuck jaws will be separated and rotative movement of the gear 18 will rotate the gear 19 at its fastest speed but with the smallest leverage. With the elliptical gears 18—19 rotated 180° from the positions shown in Figs. 3 and 4, movement of the gear 19 will be at the slowest rate, but the rotative force transmitted to the gear 19 will be the maximum. I therefore arrange the spacing of the jaws or the false jaws, and key the gears so that the work article 13 will be gripped when the elliptical gears have been rotated substantially 180° from the positions shown in the drawing. It will therefore be seen that a substantially uniform force applied to the shaft 15 through the pinion 16 and rack 17 will transmit a variable force to the elliptical gear 19 and operating screw 9, and the work article 13 may be gripped much more securely than if the force of the rack 17 were transmitted to the chuck jaws in a uniform manner.

While the parts may be so proportioned that most work articles may be inserted between the jaws after less than half a revolution of the elliptical gears 18—19, it will be plain that one or more complete revolutions of the elliptical gears could be effected so as to get a very wide opening between the jaws. It is, however, desirable that the elliptical gears shall finally be in the positions substantially 180° from those shown in Figs. 3 and 4 at the time the work article is finally gripped. By such proportioning of the parts, the maximum effect of the increased gripping action of the present chuck is obtained.

As above explained, it is advantageous to so position and proportion the parts that the chuck jaws will be in gripping engagement with the work article when the elliptical gears are rotated substantially 180° from the positions shown in Figs. 3 and 4. In order to facilitate proper positioning of the elliptical gears to attain that result, I may provide means for permitting the elliptical gears or one of them to be held at various angular positions relatively to their shafts and yet be securely held thereon. Such a means is illustrated in Fig. 5 wherein the square hole 20 is positioned in a predetermined definite angular position in the gear 19. With the hole positioned so that a perpendicular to one of the flat sides extends at an angle of 67½° to the major axis of the ellipse, eight different equally spaced angular positions of the gear 19 on the screw or shaft 9 may be obtained. It will be clear that, by removing the retaining nut and lifting the gear 19 off of the square shank on the screw 9 and again replacing the gear after rotating the same 90°, 180° or 270°, four equally spaced angular positions of the gear may be obtained. By making the gear invertible, the latter may be removed from the squared portion on the shaft and inverted, in which case four other definite positions of the gear on the shaft 9 may be obtained. By inclining the square hole in the gear as indicated in Fig. 5, the corresponding positions of the gear when face up and when inverted, will be 45° from each other. Therefore, the four possible positions with the gear face up will be at an angle of 45° to the corresponding four possible positions with the gear inverted. Therefore, eight equally spaced angular positions of the gear on the shaft are possible. By making a hole having any other number of sides, the number of angular positions possible to obtain may be made equal to twice the number of flat sides of one of the interfitting angular portions, and by positioning the angular hole at the proper angle to the major axis of the ellipse, these various positions may be spaced at equal angles to each other. By this means, therefore, the gear will always be held securely on the screw, and yet a comparatively large number of possible angular positions may be had so as to have the gears most advantageously positioned for gripping the work article as above described. It may be desirable to change the positions of both gears on their respective shafts but that is not essential.

While truly elliptical gears have been disclosed it is to be understood that other forms having teeth at different distances from their axis of revolution, such as eccentrically mounted circular gears, may be used, and by the term "elliptical" I mean to include such other forms.

While the invention has been described in detail and one specific form illustrated, I do not wish to be limited to the specific embodiment shown, nor to the particular agencies for carrying the invention into effect, for changes may be made within the scope of the invention as defined in the appended claims.

I claim:

1. In a chuck, a chuck body, a plurality of chuck jaws, and means including a pair of intermeshing gears each having teeth at different distances from the axes of rotation of said gears for moving said jaws toward each other with a variable force upon the application of a uniform force to one of said gears.

2. In a chuck, a chuck body, a plurality of chuck jaws, means for moving said jaws relatively to each other, including a pair of meshing elliptical gears, and means for driving one of said gears whereby said jaws will be moved with a variable force upon the application of a substantially uniform force to one of said elliptical gears.

3. In a chuck, a chuck body, a plurality of jaws therein, screw means for moving said jaws relatively to each other, and means including meshing elliptical gears for rotating said screw means whereby said screw means will be moved with a variable force upon the application of a substantially uniform force to one of said elliptical gears.

4. In a chuck, a chuck body, a plurality of jaws carried thereby, means including meshing eccentrically mounted gears for moving said jaws relatively to each other, a spur gear connected to one of said eccentrically mounted gears, and means for rotating said spur gear for causing said eccentrically mounted gears to rotate and move said chuck jaws.

5. In a chuck, a chuck body, a plurality of chuck jaws, means including elliptical gears for moving said jaws relatively to each other, and rack and pinion means for rotating one of said elliptical gears for causing said chuck jaws to be actuated thereby.

6. In a chuck, a chuck body, a plurality of jaws carried thereby, a right and left handed screw for moving said chuck jaws, an elliptical gear carried by said screw, a second elliptical gear meshing with said first mentioned elliptical gear and held on a shaft journaled in said chuck body, a pinion on said shaft, and a rack for rotating said pinion.

7. In a chuck, a chuck body, a plurality of chuck jaws, means for moving said jaws relatively to each other, elliptical gears for moving said means, said means having flat portions, one of said gears being invertible and having interfitting flat portions, said flat portions on said elliptical gear being positioned at definite angles to the major axis of said elliptical gear, whereby said gear may be held on said means by said flat portions in a number of substantially equidistant angular positions equal to twice the member of flat portions on one of said members.

8. In a chuck, a chuck body, a plurality of chuck jaws, means for moving said jaws relatively to each other, elliptical gears for moving said means, said means and one of said gears having squared interfitting parts for holding said gear on said means, said squared part on said elliptical gear being positioned so that a perpendicular to one of the flat sides of said squared portion lies at an angle of about 67½° to the major axis of said elliptical gear.

9. In a chuck, a chuck body, a plurality of chuck jaws, screw means for moving said jaws relatively to each other, said screw means having a square shank thereon, elliptical gears for moving said screw means, one of said gears having a square hole to be received on said square shank for definitely positioning said screw means and said elliptical gear relatively to each other, said square hole in said elliptical gear being positioned so that a perpendicular to one of the flat sides of said square hole extends at an angle of about 67½° to the major axis of said elliptical gear.

10. In a chuck, a chuck body, a plurality of chuck jaws, and means for moving said jaws relatively to each other including a rack and gear with teeth at different distances from its center of revolution, whereby a uniform force applied to said rack will exert a variable force on said jaws through said gear.

11. In a chuck, a chuck body, a plurality of chuck jaws, means for moving said jaws relatively to each other, including a gear with teeth at different distances from its center of revolution, and means for actuating said gear, whereby said gear will exert a variable force for moving said jaws upon the application of a uniform force thereto.

12. In a chuck, a chuck body, a plurality of chuck jaws for gripping a work article, actuating means for moving said jaws relatively to each other, operating means connected to said actuating means and including a toothed member having teeth at different distances from its axis of revolution, whereby a uniform force applied to the teeth of said toothed member will cause said member to exert a variable force for moving said jaws.

13. In a chuck, a chuck body, a plurality of chuck jaws, actuating means for moving said jaws relatively to each other, operating means for said actuating means, said operating means including a gear having teeth at different distances from its axis of revolution, said gear being invertible, and interfitting parts on said gear and a part of said means for holding said gear in definite angular positions whereby said gear may be held in a number of different angular positions for the purpose described.

14. In a chuck, a plurality of gripping members, and means for moving the same relatively to each other including a rotatable member and a variable leverage means for rotating said rotatable member with a variable force upon application of a uniform actuating force to said variable leverage means, said variable leverage means and rotatable member being constantly cooperatively articulated, whereby said gripping members will be moved by the same force each time they reach a predetermined position.

15. In a chuck, a plurality of gripping members, a rotary member for moving a plurality of said gripping members and means for imparting a variable force to said rotary member upon application of a uniform actuating force, said means and said rotary member being constantly cooperatively articulated, whereby said gripping members will be moved by the same force each time they reach a predetermined position.

16. In a chuck, a chuck body, a plurality of chuck jaws, rotary means for moving said jaws relatively to each other, and gearing of varying ratio to operate the rotary means relatively rapidly and with low torque during the idle portions of chuck jaw movement and relatively slowly and with high torque when the jaws are engaging with work, said rotary means and gearing being constantly cooperatively articulated, whereby said jaws will be moved at the same speed each time they reach a predetermined position.

17. In a chuck, a chuck body, a plurality of chuck jaws, rotary means and gearing of varying ratio for opening and closing the jaws with relatively low torque during one part of the jaw movement and with relatively high torque during another portion of the jaw movement, said rotary means and gearing being constantly cooperatively articulated, whereby said jaws will be moved at the same speed each time they reach a predetermined position.

18. In a chuck, a chuck body, a plurality of jaws, rotary means including gearing of varying ratio carried with said chuck body for causing the jaws to operate relatively rapidly during the idle portion of their movement and relatively slowly when engaging with work, said rotary means and gearing being constantly cooperatively articulated, whereby said jaws will be moved at the same speed each time they reach a predetermined position.

19. In a chuck, a rotary actuating member, a plurality of jaws actuated by said rotary actuating member, and gear means by which the torque applied to said actuating member is progressively increased during a part of the chuck jaw movement.

20. In a chuck, a rotary jaw actuating member, a first gear means for actuating said member, a second gear means for actuating said first gear means, one of said gear means including variable speed gearing for progressively increasing the torque applied to said rotary jaw actuating member during a part of its rotary movement.

ROBERT S. BROWN.